(12) United States Patent  
Baluja et al.

(10) Patent No.: US 8,180,667 B1
(45) Date of Patent: May 15, 2012

(54) REWARDING CREATIVE USE OF PRODUCT PLACEMENTS IN USER-CONTRIBUTED VIDEOS

(75) Inventors: Shumeet Baluja, Santa Clara, CA (US); Yushi Jing, Mountain View, CA (US); Thomas Leung, Santa Clara, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 579 days.

(21) Appl. No.: 12/132,576

(22) Filed: Jun. 3, 2008

(51) Int. Cl.
*G06Q 40/00* (2006.01)
(52) U.S. Cl. .......................................... 705/14; 705/30
(58) Field of Classification Search .............. 705/10–44
See application file for complete search history.

(56) References Cited

U.S. PATENT DOCUMENTS

| | | | | |
|---|---|---|---|---|
| 6,167,382 | A * | 12/2000 | Sparks et al. | 705/26 |
| 7,020,336 | B2 * | 3/2006 | Cohen-Solal et al. | 382/204 |
| 7,797,168 | B2 * | 9/2010 | Kusumoto et al. | 705/1.1 |
| 7,970,435 | B2 * | 6/2011 | Silverbrook et al. | 455/557 |
| 8,108,252 | B1 * | 1/2012 | Mhatre et al. | 705/14.1 |
| 2004/0260792 | A1 * | 12/2004 | Speicher | 709/219 |
| 2007/0244750 | A1 * | 10/2007 | Grannan et al. | 705/14 |
| 2007/0282675 | A1 * | 12/2007 | Varghese | 705/14 |
| 2009/0037262 | A1 * | 2/2009 | Patil | 705/14 |

OTHER PUBLICATIONS

Liu, T., "Fast Nonparametric Machine Learning Algorithms for High-dimensional Massive Data and Applications," Carnegie Mellon University School of Computer Science, Mar. 2006, 138 Pages.
Sivic, J., et al., "Video Google: A Text Approach to Object Matching in Videos," Proceedings of the Ninth IEEE International Conference on Computer Vision (ICCV 2003), 2003, pp. 1-8.
U.S. Appl. No. 12/038,478, filed Feb. 27, 2008.
U.S. Appl. No. 11/858,368, filed Sep. 20, 2007.

* cited by examiner

*Primary Examiner* — Frantzy Poinvil
(74) *Attorney, Agent, or Firm* — Fenwick & West LLP

(57) ABSTRACT

A video hosting service automatically identifies, in a video database, a set of videos associated with an advertiser, and presents the identified videos to the advertiser for consideration. The videos may be selected based on analysis of their video content for images of logos associated with the advertisers. The video hosting service may then receive from the advertisers a listing of which of the presented videos should be given an award.

19 Claims, 7 Drawing Sheets

REWARDING CREATIVE USE OF PRODUCT PLACEMENTS IN USER-CONTRIBUTED VIDEOS

BACKGROUND

1. Field of Art

The present invention generally relates to the field of advertising, and more specifically, to methods of identifying user-submitted digital product placement videos meriting an award by an advertiser.

2. Background of the Invention

Currently, obtaining high-quality advertisements for a product or service is an extremely costly endeavor, involving hiring professional advertising agencies and consequently requiring a large financial investment on the part of the organization commissioning the advertisement. At the same time, web-based video hosting services such as Google Video™ and YouTube™, which allow the uploading and viewing of digital videos, receive hundreds of thousands of user-contributed videos daily, which are viewed by hundreds of millions of users. Such video hosting services depend in part upon the creativity of their user base to attract increasing numbers of viewers.

Although such user-submitted videos have the potential to serve as effective product placement videos for advertisers, current video hosting services do not provide advertisers with an effective mechanism for determining which videos merit consideration as product placement videos. Although current video hosting services permit authors to label a video with a keyword (e.g., a product name), they are not capable of verifying that a given video in fact contains images corresponding to the keywords (e.g., images of the product). Nor are current video hosting services capable of quantifying the number or duration of appearances of product images. Thus, not only do current systems fail to provide an incentive for users to submit product placement videos, but they also fail to provide a reliable means for advertisers to determine which user-submitted videos are most likely to merit their attention and thereafter to reward them.

SUMMARY

A video hosting service (such as a server for a video hosting web site or web-based video service) is adapted to receive videos from third parties and identify in each video the number and duration of appearances of advertiser logos within the received videos. This information can be provided to the advertisers as a basis for the advertisers to selectively reward the users who created the videos. To identify a given logo in the videos, the video hosting service can obtain a set of images related to the logo in question and generate a logo fingerprint that represents the features of the logo. Then, the video hosting service can compare the logo fingerprint to portions of a given video, to identify portions of the video that contain the logo. Statistics regarding the number, location, and duration of portions of the video containing the logo, as well as statistics regarding views of each logo within the videos (e.g., frequency, duration, recency, popularity, etc.) can be determined. These logo appearance statistics are made available to advertisers interested in quickly and reliably determining which user-submitted videos best promote their logos. The video hosting service then may receive from the advertisers selections of the videos to which the advertisers wish to give an award in recognition of the video's use of their logo. The video hosting service can then use this information to update its records on past award recipients and provide this information to its user community.

In one embodiment, a set of videos associated with an advertiser is automatically identified in a video database based upon image content of the videos, each video having a video identifier. The set of video identifiers is presented to the advertiser. Then, a selection of at least one video identifier from the set of presented video identifiers is received from the advertiser, the selection corresponding to a video chosen by the advertiser to receive an award from the advertiser.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
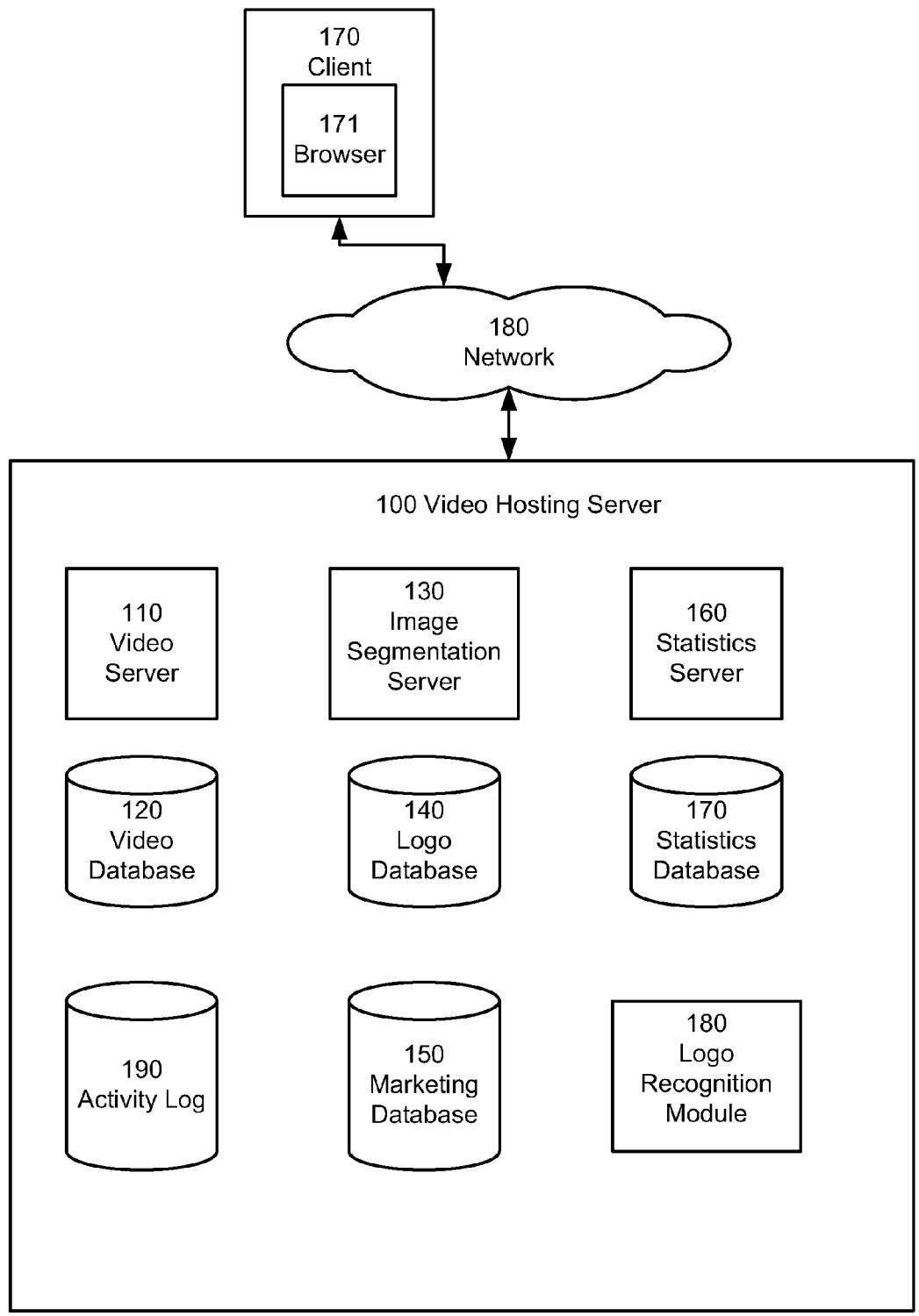
FIG. 1 is a block diagram of a video hosting system in accordance with one embodiment of the present invention.

FIG. 1 illustrates the architecture of a video hosting and analysis system enabling advertisers to identify and award meritorious product placement videos, according to one embodiment. A client device, such as that used by an advertiser or user of the video hosting service, communicates with a video hosting server 100 of the video hosting service via a network 180. The method of communication is not limited to any particular user interface or network protocol, but in a typical embodiment a user interacts with the video hosting service via a conventional web browser 171, which employs standard Internet protocols.

The video hosting server 100 need not be a single machine, but in one embodiment is made up of a number of sub-units, each of which may be embodied in a different machine. For example, referring to the embodiment of FIG. 1, video hosting server 100 further comprises a video hosting server 110. The video hosting server 110 fulfills user requests for given videos, e.g. those submitted by a user by clicking on a link to a video on a web page generated by the video hosting service, by transferring the data representing the video to the user's computer. Data transfer typically takes place in the form of video streaming.

Video database 120 stores the video data for the videos requested by the user. Associated with the video database 120 is an activity log 190, which stores information describing each access to any video by any user. This information includes a video identifier, user identifier, access type, start and stop times of the view, and any other data useful for tracking individual or aggregate user behavior. For example, one entry might store that a user at a given IP address started viewing a particular video at frame 1 and stopped viewing at frame 452. As discussed below, such entries are useful for determining whether or not a viewer actually viewed a portion of the video containing the logo.

Marketing database 150 contains identifiers for logos of interest, such as the strings "Coke,"™ "Starbucks,"™ etc. It may also contain, in association with the logo identifiers, one or more images for each of the logos or images of products associated with the logos; images of products or logos will be referred to as logo images. The logo images can be expressly provided by the respective advertisers or manually chosen by the video hosting service, for example, by keyword searches on the video content in the database, or from an external image database. As later discussed, such storing of image data is an alternative to automatically obtaining image data.

Logo database 140 stores feature information derived from the logo images ("fingerprints") or other identifying data for the logos of interest. Such identifying data is then used for identifying appearances of the logos within videos.

Image segmentation server 130 is responsible for processing images, such as the logo images and individual frames from a video, and returning information on the significant regions of the images/frames in which objects are located.

Logo recognition module 180 uses data provided by the logo database 140 and image segmentation server 130 to recognize appearances of logos within user-submitted videos, thus generating information on how often, and in which portion of a video, the logo appeared.

Statistics database 170 stores statistics on the appearance of logos within videos and on how frequently the logo-containing portions were actually viewed by users, including number of views, and total duration of views. A 'view' occurs when a user plays a video for some minimum duration (e.g., 30 seconds). Such statistics are generated based on the appearance information from the logo recognition module 180 and the activity log 190. Statistics server 160 then provides the information from statistics database 170 to advertisers.

In one embodiment, the video hosting service presents a set of Application Programming Interfaces (APIs) to outward clients or other services and allows the clients or other services to generate and display the user interfaces described below in connection with a web-based system. For example, instead of generating the user interface of FIG. 5, such a system might provide the raw data needed for such an interface to a requesting client or service and allow the client or service to generate the actual user interface.

Process

Figure 3:
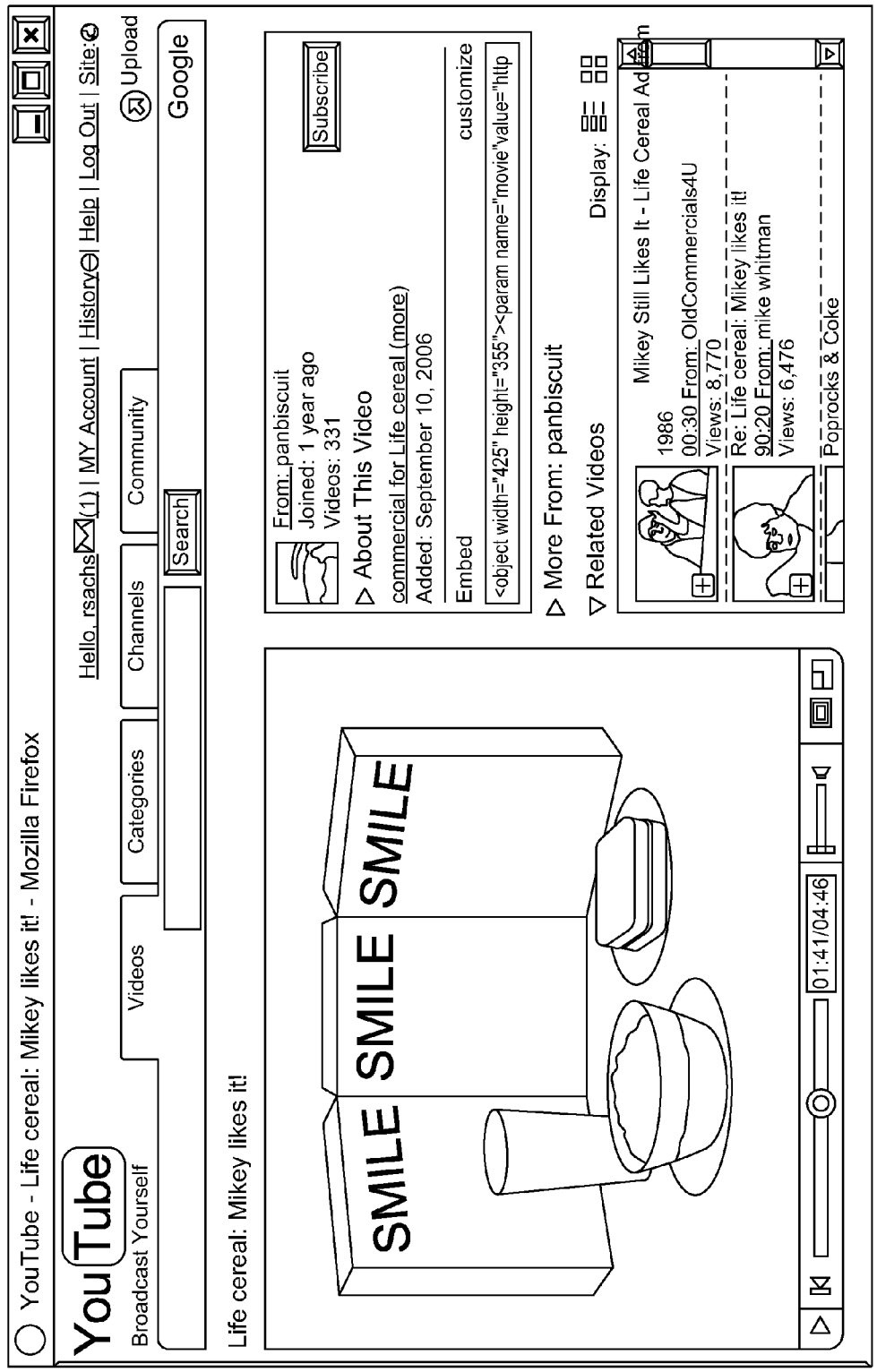
FIG. 3 is a screen shot illustrating a sample product placement video.

As a preliminary matter, the video hosting server 100 may solicit, and the various users submit 202, videos in which particular products or services are displayed in a noticeable manner ("product placement videos"). These videos are stored in the video database 120. FIG. 3 illustrates a simple example of a product placement video with a product logo (for a hypothetical "Smile" cereal) displayed in a noticeable manner, though many other examples are equally possible.

Separately, advertisers may provide images of their products containing product logos, such logo images being stored in the marketing database 150. Each logo image is associated with an advertiser and a logo or product name. Thus, for a given logo or product name, there will be a set of logo images containing logos of the product. Additionally, a given product logo or product name may be associated with other metadata, such as product category, keyword, etc., and such data can be used as an initial criterion for determining whether a video contains a product logo. For example, a video could be analyzed to determine whether it contains a logo of interest only if its title or caption contains the name of the logo.

A collection of logo images, either from the marketing database 150 or from an external source such as the Internet or an Internet crawl, is preprocessed 204 in order to create or augment the logo database 140. For a given logo, the logo images are processed to generate one or more fingerprints representing the image features of the logo. This includes generating feature vectors of image features of the logo images, selecting feature vectors representing the logo (a "logo fingerprint"), and arranging the selected feature vectors in a data structure permitting efficient matching of feature vectors subsequently extracted from the videos. Various types of image feature identification algorithms can be used for generating the feature vectors and constructing the fingerprints.

Then, using this logo database 140, logo analysis is performed 206 on the various ones of the videos of the video database 120. Such logo analysis of the videos includes, for each video analyzed, segmenting individual frames of the video so as to facilitate logo matching, and then matching the logo fingerprints against the video in order to produce logo appearance statistics for that video.

Logo appearance statistics are published 208 to enable advertisers to determine which videos are of most relevance to their logo(s).

Finally, the video hosting service may receive from an advertiser an identifier of one or more user-submitted videos to be given an award. These stages are now described in more detail below.

At stage 202, the video hosting server 100 of the video hosting service receives 202 product placement videos from the users. The user interface used to submit the product placement videos need not differ from the interface used to submit traditional videos, although a custom interface may equally be provided. One example of a custom submission interface is an interface allowing a user to designate a submitted video as being associated with a particular product or product name, or a particular advertiser. An advertiser can also run contests for product placement videos. For example, a user could indicate that a video was a submission for a product placement video contest being held by a particular automobile manufacturer.

Figure 4:
FIG. 4 is a screen shot illustrating the addition of video contest information to a video hosting web site.

In order to receive a sufficiently large number of product placement videos, it is of course preferable that the video hosting service and/or the advertisers let the users of the video hosting service know that awards are available for the most meritorious submissions. This might be achieved by, for example, listing on the video hosting web site the participating advertisers and/or their associated product and service logos, along with a description of any awards that the advertisers are currently offering for the best videos provided. FIG. 4 is a screenshot providing an example of such a listing for advertiser-sponsored contests. Contest information area 402 lists information about contests being offered for the month of November, with two large sponsors listed, and further contest listings available via the "More . . . " link. Users not already familiar with video submission contests may click on the "Learn more" link to gain access to information on what such contests are and how they are conducted.

Figure 2:
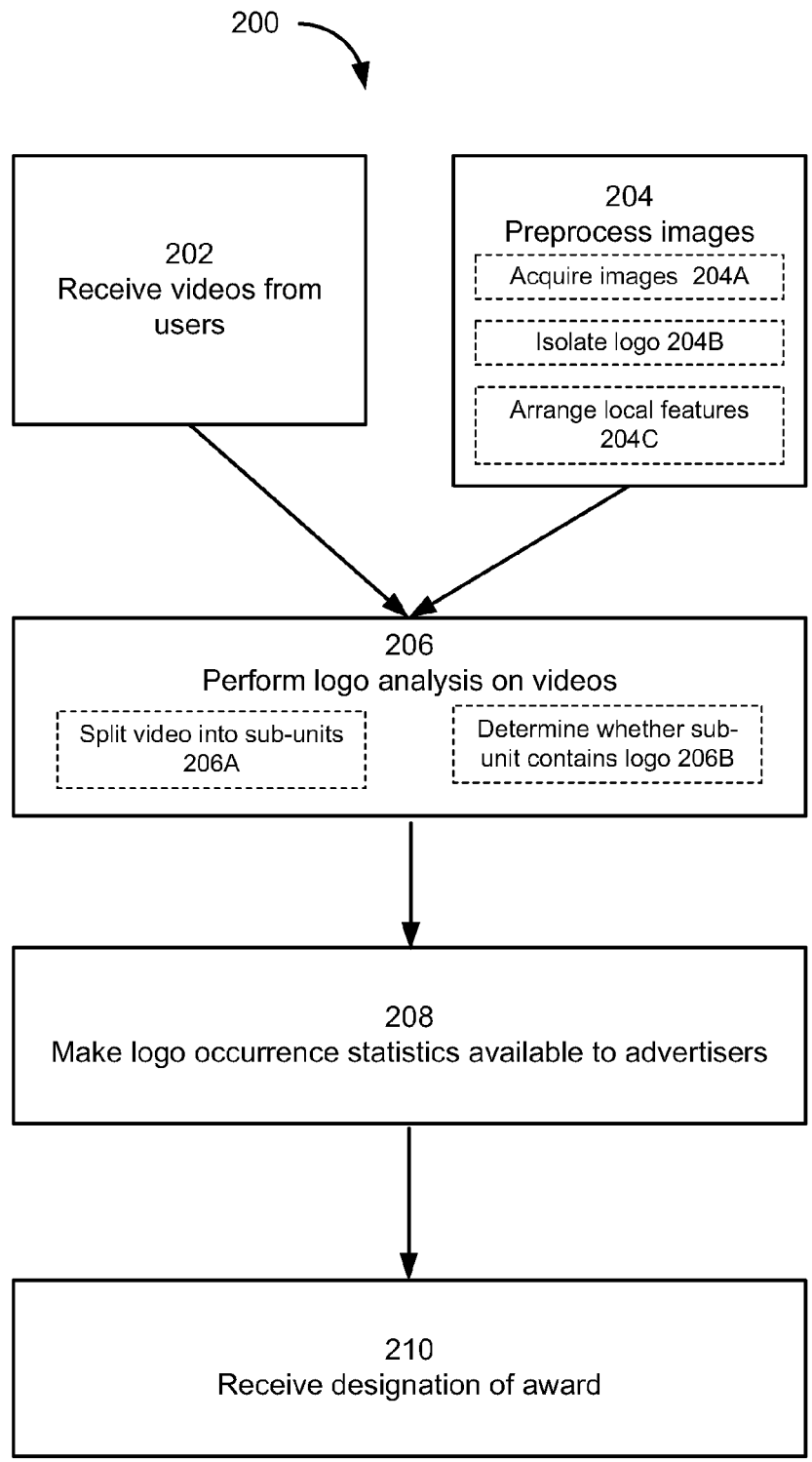
FIG. 2 is a flowchart illustrating a high-level view of a process of determining awards for user-submitted product placement videos.

Referring again to FIG. 2, at stage 204, image segmentation server 130 preprocesses a set of images so as to create a logo database for logos of interest. The logos considered to be of interest may be chosen in various ways, such as by selecting the logos explicitly provided by advertisers using the video hosting system for soliciting product placement videos, as noted above. Alternatively, a broader logo database may be formed by choosing all the well-known logos collected from the marketing database 150. This alternative allows logo appearance statistics to be tracked for a variety of logos, including those for advertisers who are not yet using the system for soliciting videos, but who might be encouraged to do so when presented with the statistics. Then, with the set of logos of interest determined, the following preprocessing operations are performed for each logo of interest.

In a first operation, images containing the logo are acquired 204A. As noted above, advertisers who use the video hosting system to solicit product placement videos may provide representative images of the logo. However, it may be desirable to a video hosting system to track logo appearance statistics for a broad range of advertisers, including advertisers who have not already provided such images. Thus, a technique for automatically acquiring logo images is also provided. In such a technique, the acquired images need not be extracted from videos of the video database 120 itself, but instead preferably come from a broad, representative source of images. For example, in one embodiment the set of acquired images is drawn from images publicly available on the Internet and indexed by an image search engine such as Google™ Image Search. In such an embodiment, the video hosting service 100 calls the image search engine using the search engine's API, specifying an identifier for the logo of interest, such as the string "Coke"™, and the search engine provides a set of images matching the identifier, such as images containing cans or bottles of COCA-COLA™.

In a second operation 204B, image segmentation server 130 processes the set of images for each advertiser logo so as to generate logo fingerprints later used to identify the appearance of a logo in a video. For each image of the set of images, the image segmentation server 130 identifies local features, points that are of interest due to their discontinuities in feature characteristics with respect to surrounding points. Each local feature is assigned an identifying feature vector comprising data on associated attributes such as color value. Then, by comparing the regions of the image having local features matching those of the other images and combining those regions that are sufficiently similar, the boundaries of individual objects are recognized. With the object boundaries determined for each object in each image, image segmentation server 130 determines which object is most common across the set of images and thus represents the desired logo. This object is then extracted from one of the images in which it was found, with the feature vectors of the local features for the object constituting a fingerprint for the logo. The fingerprint is then saved to the logo database 140 along with a logo identifier of the logo which it represents. Storing the logo fingerprint allows for more efficient matching when searching for a logo within a video at stage 206 than would merely storing and matching image pixel data. The image segmentation server 130 may implement any type of object identification algorithm for identifying the logos in the images, and creating a fingerprint (or other condensed representation of the image features). One implementation of the image segmentation server 130 is further described below.

In a third operation 204C, image segmentation server 130 stores the feature vectors for the local features of the logo in an index to permit efficient matching during stage 206. Specifically, for a set of feature vectors, it is important to find, for one of the feature vectors, a "nearest neighbor" having a most similar feature vector according to some similarity metric. Any indexing structure may be used; one suitable indexing structure is spill trees, which represent an approximate method to solve a nearest-neighbor problem. Spill trees are further described in the thesis "Fast Nonparametric Machine Learning Algorithms for High-dimensional Massive Data and Applications" (Ting Liu, Carnegie Mellon University School of Computer Science, March 2006).

At stage 206, logo recognition module 180 performs logo analysis on various ones of the videos of the video database 120. Such analysis involves using the logo database 140 for performing matching and thereby tabulating the appearance statistics of the logo within the videos. The logo recognition module 180 uses the fingerprints of the logos selected for processing and matches those fingerprints against the videos. The following steps are thus applied to each video selected for processing.

In one embodiment, a video is divided into its constituent frames. Then, each frame (or selected sampled frames) is processed using the object identification algorithm of the image segmentation server 130 to generate a fingerprint (or a collection of fingerprints), as described above. This frame fingerprint is compared to the logo fingerprints in the logo database to determine whether the frame contains any of the logos within the logo database. The resulting logo appearance statistics for that video include, for each logo, the total number of frames that included the logo, and/or the total time duration of the appearance of the logo. These statistics are stored in the statistics database 170.

An alternate embodiment likewise divides the video into its constituent frames, but additionally identifies a set of regions that are visually interesting across the frames. Identifying visually interesting regions can be achieved by counting and identifying the most frequently occurring local features in a collection of frames. Alternately, it can be achieved by clustering the feature vectors of the local features identified in a collection of frames, such that those local features close to the center of the cluster are selected as "interesting" local features, and a collection of such local features forms a visually interesting region. K-mean clustering is one clustering algorithm that is effective for this purpose. Then, only the set of visually interesting regions, and not the frames themselves, need be examined. Such an approach has the advantage of reducing the amount of calculations required for logo matching: instead of requiring analysis of a large number of complete image frames, only some considerably smaller number of regions common across several frames, each region much smaller than an entire frame, need be analyzed. If one of these visually interesting regions is found to match the logo in question, a count of the number of frames containing the logo can be updated by adding to the current count the number of frames spanned by that visually interesting region.

Additionally, in some embodiments it is useful to track, not only a total number of appearances or playing time of the logo, but also to maintain a list of when the logos appeared. As described below, correlation of such an appearance times list with an "activity log" enables quantification of how much users actually viewed the logo.

It is appreciated that stage 206 need not examine a video with respect to every logo within the logo database. Rather, it is equally possible to perform the analysis for a subset of the logos, including a single logo, for example.

The statistics generated and stored in statistics database 170 include logo frequency of appearance information. This can be expressed in a variety of ways, such as, for example, a total number of frames containing the logo, a total amount of time during which the logo is displayed, a percentage of the overall videos containing the logo, or a number of distinct occurrences of the logo. Each such statistic can be derived in a straightforward manner from the frame count or other frequency statistic produced at operation 206B above.

Additionally, the statistics preferably include quantifying how much users actually viewed the portions of the video containing the logo. A rough approximation of this additional viewing statistic can be achieved by tracking how often the video was viewed, making the assumption that the entire video was viewed and thus the logo was necessarily viewed. Alternatively, a more accurate viewing statistic is achieved by use of the activity log 190, which stores start and stop times for previous views of the video by users. Thus, the frames containing the logo can be checked against the activity log 190 to ensure that they were within the portion of the video actually played by a user. One statistic tracked by such a method is total user viewing time, which involves checking the frames of a video containing the logo against the activity log entries, summing the counts for frames within a range that was viewed, and translating the frame count to a corresponding viewing time. Since the activity log 190 contains entries for all users who viewed a given video, this statistic represents a total viewing time by all users of the video hosting service. Of course, the statistic can be adjusted as desired, such as by counting repeat viewing by the same user differently than first-time viewing by another user, for example. A related statistic is average viewing time per user, which can be determined by dividing the total viewing time by the number of distinct users who viewed the video.

Further useful statistics include general viewing statistics, such as total number of times that a video has been viewed, number of viewings during the current week and previous week, etc.

Figure 5:
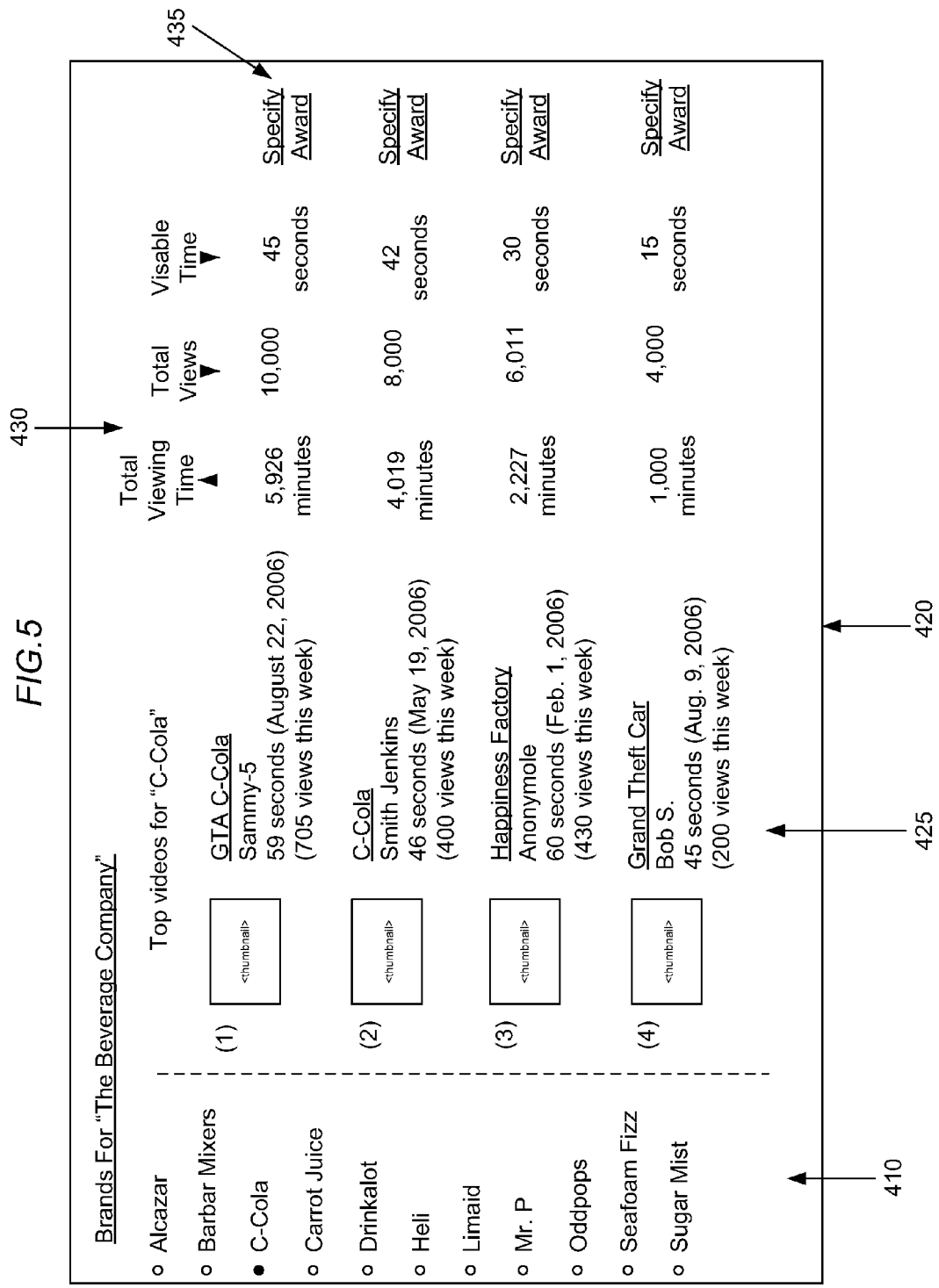
FIG. 5 is a screen shot illustrating a user interface provided by a video hosting server to an advertiser.

At stage 208, the logo appearance statistics generated at stage 206 and stored in statistics database 170 are made available so as to allow an advertiser to determine the candidate videos most likely to merit an award. FIG. 5 illustrates a specialized advertiser-specific user interface in which an advertiser specifies an identifier of a logo of interest and the system in response displays, along with corresponding logo appearance statistics, those videos that best feature the logo. Such a user interface might be reserved for advertisers who have an account with the video hosting service specifically for this purpose and who have successfully provided login information.

Referring to FIG. 5, logo selection area 510 lists all the logos/brands associated with a particular advertiser (the Beverage Company, in the example of this Figure). The advertiser chooses one of the logos (e.g. "C-Cola"), and the videos that best feature that logo are then displayed in video results area 520.

In this example, the video "GTA C-Cola" has been determined to best feature the logo, and a variety of information about it is displayed in video information area 525, including a thumbnail of the video, its length (59 seconds), its author ("Sammy_S"), its date of submission to the video hosting service (Aug. 22, 2006), and the number of times that it has been viewed within the last week (705).

Which videos best feature the logo is determined according to a given metric, preferably one that is a function of one or more of the statistics stored in statistics database 207, and preferably selectable via the advertiser user interface. FIG. 5 illustrates the use of three metrics 530 for use in ranking the videos: "Total viewing time," representing the aggregate viewing time of portions of the video containing the logo by all users of the video hosting service; "Total views," representing how many total times the video has been viewed by users, and "Visible time," representing the total number of second that the logo is visible in the video. In this example, the video "GTA C-Cola" has been determined to best feature the logo according to the "Total viewing times" metric. An advertiser using the interface of FIG. 5 may click on one of the "Total viewing time", "Total views", and "Visible time" headers to arrange the video results in decreasing order of relevance according to that metric. The upward-pointing arrow over the "Total viewing times" metric indicates that it is the metric currently being used to sort the video results.

At optional stage 210, video hosting server 100 receives from the advertiser an identifier of one or more user-submitted videos to be given an award. For example, referring again to FIG. 5, the advertiser can click on the "Specify award" link 535 associated with a given video. The advertiser could then be presented with a user interface for specifying the nature and amount of the award (e.g. a new car, a cash price, etc.). Such an interface could also present additional information about awards presented so far, an amount paid versus a previously specified budget, and the like. Many other features of such an interface would be apparent to one of skill in the art.

Allowing an advertiser to specify the awards via the video hosting service is particularly useful for video hosting services in which the identity and contact information of a video's author is not readily obtainable, and thus an advertiser cannot directly provide an award to the author. Additionally, this affords the video hosting service the opportunity to track information on current and past award recipients and to make such information available on the site, thus further inspiring users to submit product placement videos.

In sum, the embodiments described above enable an advertiser to quickly and reliably identify which user-submitted videos on a video hosting service are good candidates for use as product placement videos and to specify which identified videos should be given an award. This in turn creates an incentive for users to submit more product placement videos for the consideration of the advertisers.

It is appreciated that the above-disclosed user interfaces are purely for purposes of example, and that a great variety of other user interface mechanisms, types of video information, metrics, and statistics would be known to those of skill in the art and could equally well be utilized.

Additionally, it is appreciated that the stages described above need not occur sequentially in the precise order in which they are described. For example, the stages relating to receiving 202 videos from users and preprocessing 204 images may occur in either order, or may be performed in parallel. Additionally, the stages are not necessarily done all at once but may overlap, with stages being repeated as necessary when new video or image data is acquired. For example, after statistics on logo occurrence are published 208, receipt 202 of additional videos leads to performing 206 additional logo analysis.

Further note that in some embodiments, the logo detection actions of stages 204 and 206 may be modified slightly based on information provided by the video authors. For example, if a video author has specified, e.g. via associated keywords or by submitting the video as part of a contest sponsored by a particular advertiser, that the video is relevant to a particular logo, the logo analysis of stage 206 may employ a more lenient test when determining whether the logo is actually present. Alternatively, logo detection may be omitted entirely, instead relying on author-submitted information about the presence of logos. However, such an approach lacks both the ability to detect "spamming" by video authors and the further ability to provide a ranking of videos by relevance, and so is not be appropriate for many situations.

Image Segmentation

Additional background is now provided regarding image analysis, and more particularly, the image segmentation server discussed above with respect to operation 204B.

Figure 6:
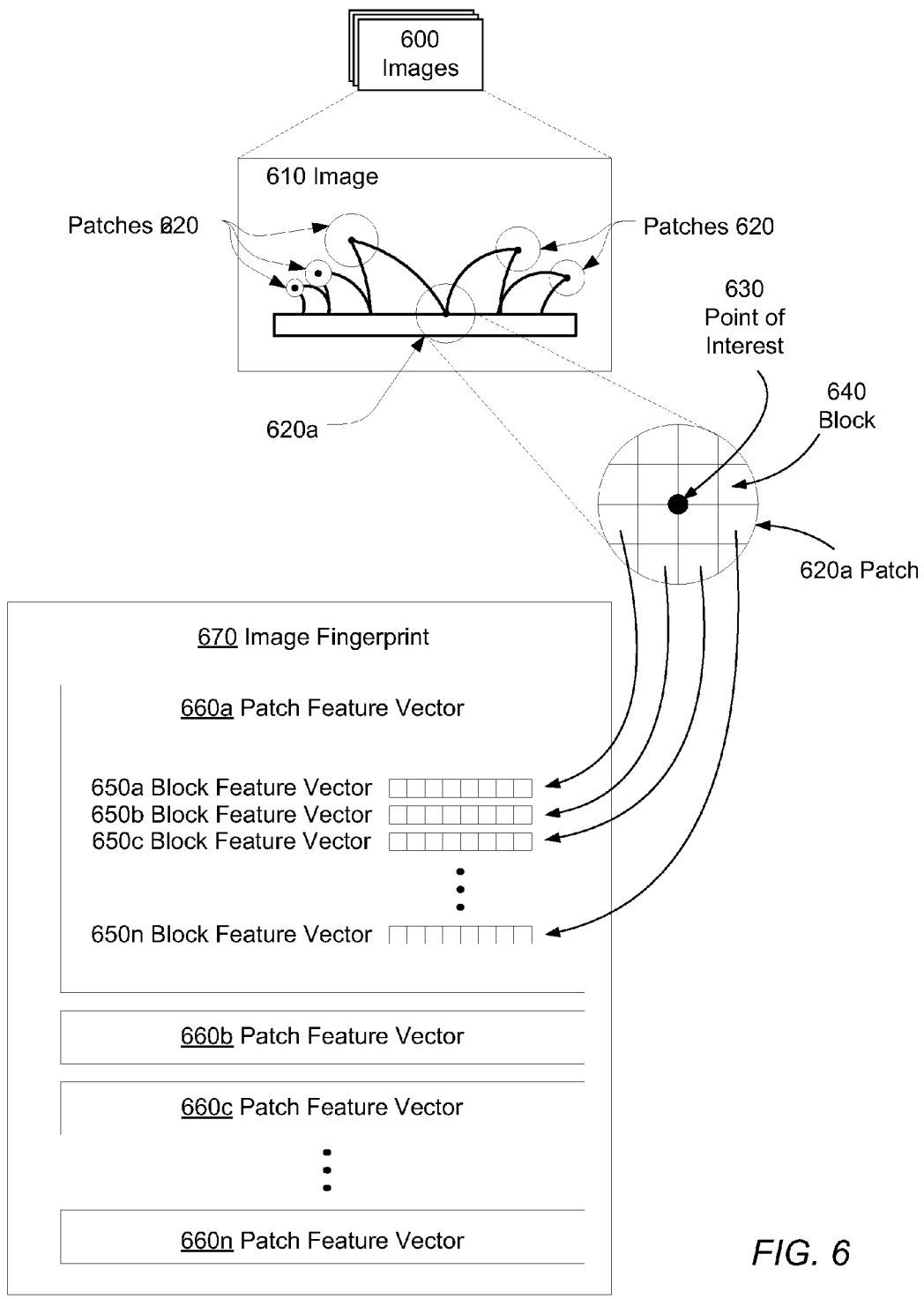
FIG. 6 illustrates aspects of images analyzed during image segmentation.

FIG. 6 is an illustration of aspects of image analysis in accordance with one embodiment of the present invention. Images 600 represent a set of images that are ready for segmentation. Image 610 is one image among a collection of images 600. A similar analysis as described in the following paragraphs is performed on each of the other images 600 in the collection.

Features are identified at various locations on the image. In one embodiment, a feature is any programmatically distinguishable characteristic associated with a point on the image that is considered significant based on determining any number of characteristics associated with that point, such as edge, color, intensity, texture, wavelet transforms, corner, or orientation histogram. From among these features at various points or locations of the image, points of interest are determined by identifying those points with a high variation of current features from the surrounding features, i.e., discontinuities in feature characteristics. Points of interest may be detected computationally as discontinuities or differences from surrounding points using any known method such as the Harris or Difference of Gaussian (DoG) method. However, other methods may be used for detecting points of interest. FIG. 6 shows several such points of interest and one such point of interest 630 is highlighted. A collection of matching local features defines an object on an image. An image may contain many such objects.

A patch is a defined region around a point of interest and that contains a salient feature on the image. Patch 620a is a patch defined around the point of interest 630. Image 610 shows several patches 620 defined at varying scales at each point of interest on the image. Patches may have any shape associated with them, i.e., circular, rectangular, etc. FIG. 6 illustrates the use of circular patches, as will be used throughout the various embodiments described herein. Circular patches are defined by a radius and a pixel offset of the center of the circle from a corner of the image represented in a suitable coordinate system for the image. In addition, patches may also have an orientation associated with them, the orientation being an angle relative to an initial axis (e.g., horizontal or vertical axis). Patch orientation is defined by identification of an intensity gradient with the patch. Each patch from among the set of patches 620 defined around the salient features of the image is defined in this manner. Patches may be generated using any known method such as scale-invariant feature transform. Collectively, the patches define the salient features of an image. Hence, an object on the image may be represented by the locus of patches corresponding to salient features of the object.

Each patch is gridded into a number of blocks. As an example, FIG. 6 shows patch 620a having grid of 16 blocks, such as block 640. A block is a sub-section of a patch that helps to quantize patch characteristics such as orientation. Patches may be gridded into blocks using any known method such as those that generate log-polar grids or logarithmic spiral grids.

An object on an image may be represented by a multi-dimensional vector of numerical features. Such numerical representations of objects facilitate processing and statistical analyses. The numerical values corresponding to features vary with the feature, e.g., for images the feature values may be pixels of the image, for color distributions on an image the feature values may correspond to the Red-Green-Blue (RGB) colorspace or the YIQ colorspace, etc. Such vectors are referred to as feature vectors. The dimensionality of the feature vector may be adjusted through various techniques such as by choosing a bin size for the feature values thereby determining the number of bins that define the feature vector. FIG. 6 shows 8-bin block feature vectors 650a, 650b, 650c, through 650n corresponding to each of the n blocks in patch 620a. For example, if patch 620a is gridded into sixteen blocks 640 and each block 640 has an 8-bin block feature vector 650a, 650b, 650c, etc. then the entire patch 620a has feature values in 128 bins (16 blocks×8 bins per block). In one embodiment, the 8-bin block feature vectors for each of the 16 blocks are stacked or merged to arrive at a 128-bin patch feature vector. FIG. 6 illustrates the generation of patch feature vector 660a from the constituent block feature vectors 650a, 650b, etc. from each block within patch 620a. The bin size and number of bins may be varied to alter the dimensionality of the feature vectors to adequately represent the feature being detected. Similarly, other patch feature vectors 660b, 660c, through 660n are derived from other features represented by other patches 620.

Figure 7:
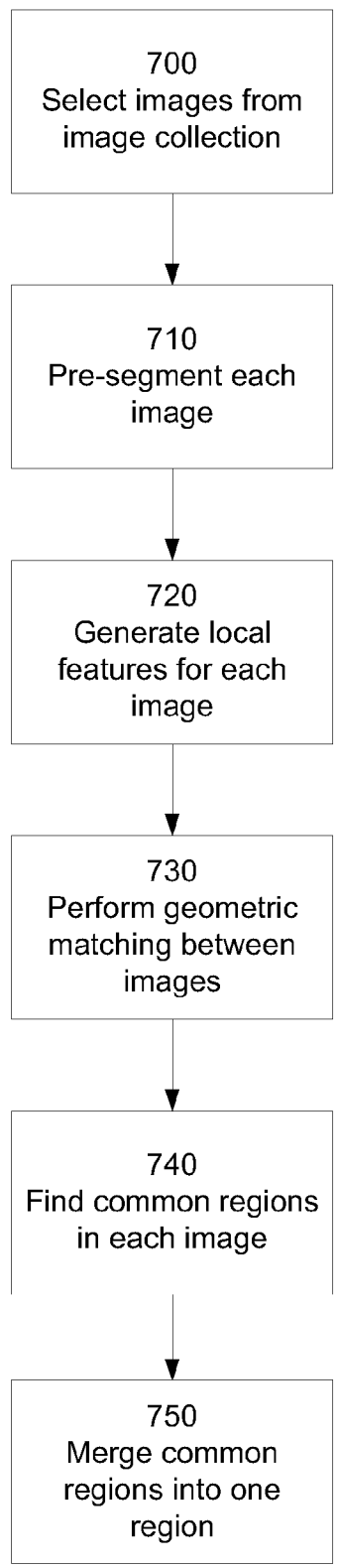
FIG. 7 is a high-level flow diagram illustrating the steps involved in image segmentation from a collection of images in accordance with one embodiment of the present invention.

FIG. 7 is a high-level flow diagram illustrating the steps involved in image segmentation from a collection of images in accordance with one embodiment of the present invention. The candidate images that will be subjected to image segmentation are selected 700 from an image collection. Each selected image is pre-segmented 710 using commonly used methods such as those based on color, texture, etc. Alternately, smoothing or geometric constraints may be enforced on the pre-segmented regions. The next step involves generating 720 local features at various points of interest on each image. Any number of features may be computed. Given a set of features from image A and a set of features from image B, the next step is to find the correspondence between those features by geometric matching 730 or verification. Given a collection of correctly matched points of interest, together with the initial boundaries using traditional image segmentation techniques, a collection of common regions may be found 740 in each image. Finally, the common regions are tabulated and merged 750 into a single region representing a coherent object.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of inducing submission of product placement videos to a video hosting service, the video hosting service storing a plurality of videos in a video database, the method comprising executing non-transitory software on a computer having a processor to perform the steps of:
   automatically identifying in the video database a set of videos associated with an advertiser using automated image analysis of frames of content of the set of videos, each identified video having a video identifier, the identifying comprising:
      storing a plurality of logo fingerprints, each logo fingerprint derived from one or more logo images and associated with an advertiser, and
      matching a logo fingerprint associated with the advertiser to an image of the advertiser logo appearing in the set of videos;
   presenting the set of video identifiers to the advertiser; and
   receiving, from the advertiser, a selection of at least one video identifier from the set of presented video identifiers, the selection corresponding to a video chosen by the advertiser to receive an award from the advertiser.

2. The method of claim 1, wherein automatically identifying a set of videos associated with the advertiser additionally uses a name associated with the advertiser accompanying submission of the video to the video database.

3. The method of claim 1, further comprising presenting appearance statistics to the advertiser for a plurality of the identified videos, appearance statistics for a given video comprising how frequently the advertiser logo occurred in the given video.

4. The method of claim 1, wherein storing the plurality of logo fingerprints comprises:
   receiving a logo identifier corresponding to the advertiser logo;
   identifying a set of images associated with the logo identifier; and
   forming a logo fingerprint based on the identified set of images.

5. The method of claim 4, wherein forming a logo fingerprint based on the identified set of images comprises:
   identifying local features on a plurality of the images;
   determining feature vectors for the identified local features;
   identifying objects by comparing the feature vectors;
   selecting as the logo fingerprint for the advertiser logo an identified object most frequent in the identified set of images.

6. The method of claim 1, wherein matching the logo fingerprint to the image of the advertiser logo appearing in the video, comprises:
   identifying a set of regions that are visually interesting across a plurality of frames of the video; and
   matching the logo fingerprint to one of the set of regions.

7. The method of claim 1, wherein the videos in the video database are not submitted to the video database in association with an advertiser.

8. A computer readable storage medium storing a computer program executable by a processor for inducing submission of product placement videos to a video hosting service, the video hosting service storing a plurality of videos in a video database, the actions of the computer program comprising:
   automatically identifying in the video database a set of videos associated with an advertiser using automated image analysis of frames of content of the set of videos, each identified video having a video identifier, the identifying comprising:
      storing a plurality of logo fingerprints, each logo fingerprint derived from one or more logo images and associated with an advertiser, and
      matching a logo fingerprint associated with the advertiser to an image of the advertiser logo appearing in the set of videos;
   presenting the set of video identifiers to the advertiser; and
   receiving, from the advertiser, a selection of at least one video identifier from the set of presented video identifiers, the selection corresponding to a video chosen by the advertiser to receive an award from the advertiser.

9. The computer readable storage medium of claim 8, wherein automatically identifying a set of videos associated with the advertiser additionally uses a name associated with the advertiser accompanying submission of the video to the video database.

10. The computer readable storage medium of claim 8, further comprising presenting appearance statistics to the advertiser for a plurality of the identified videos, appearance statistics for a given video comprising how frequently the advertiser logo occurred in the given video.

11. The computer readable storage medium of claim 8, wherein storing the plurality of logo fingerprints comprises:
   receiving a logo identifier corresponding to the advertiser logo;
   identifying a set of images associated with the logo identifier; and
   forming a logo fingerprint based on the identified set of images.

12. The computer readable storage medium of claim 11, wherein forming a logo fingerprint based on the identified set of images comprises:
   identifying local features on a plurality of the images;
   determining feature vectors for the identified local features;
   identifying objects by comparing the feature vectors;
   selecting as the logo fingerprint for the advertiser logo an identified object most frequent in the identified set of images.

13. The computer readable storage medium of claim 8, wherein matching the logo fingerprint to the image of the advertiser logo appearing in the video, comprises:
   identifying a set of regions that are visually interesting across a plurality of frames of the video; and
   matching the logo fingerprint to one of the set of regions.

14. A computer-implemented system for inducing submission of product placement videos to a video hosting service, comprising:
   a video database storing videos received from third parties by a video hosting service;
   a video analysis module executed by a computer and adapted to:
      automatically identify in the video database a set of videos associated with an advertiser using automated image analysis of frames of content of the set of videos, each identified video having a video identifier, the identifying comprising:
         storing a plurality of logo fingerprints, each logo fingerprint derived from one or more logo images and associated with an advertiser, and
         matching a logo fingerprint associated with the advertiser to an image of the advertiser logo appearing in the set of videos;
      present the set of video identifiers to the advertiser; and
      receive, from the advertiser, a selection of at least one video identifier from the set of presented video identifiers, the selection corresponding to a video chosen to receive an award from the advertiser.

15. The computer-implemented system of claim 14, wherein automatically identifying a set of videos associated with the advertiser additionally uses a name associated with the advertiser accompanying submission of the video to the video database.

16. The computer-implemented system of claim 14, the video analysis module further adapted to present appearance statistics to the advertiser for a plurality of the identified videos, appearance statistics for a given video comprising how frequently the advertiser logo occurred in the given video.

17. The computer-implemented system of claim 14, wherein storing the plurality of logo fingerprints comprises:
   receiving a logo identifier corresponding to the advertiser logo;
   identifying a set of images associated with the logo identifier; and
   forming a logo fingerprint based on the identified set of images.

18. The computer-implemented system of claim 17, wherein forming a logo fingerprint based on the identified set of images comprises:
   identifying local features on a plurality of the images;
   determining feature vectors for the identified local features;
   identifying objects by comparing the feature vectors;
   selecting as the logo fingerprint for the advertiser logo an identified object most frequent in the identified set of images.

19. The computer-implemented system of claim 14, wherein matching the logo fingerprint to the image of the advertiser logo appearing in the video, comprises:
   identifying a set of regions that are visually interesting across a plurality of frames of the video; and
   matching the logo fingerprint to one of the set of regions.

* * * * *